US012571735B2

(12) United States Patent
Ajit et al.

(10) Patent No.: US 12,571,735 B2
(45) Date of Patent: Mar. 10, 2026

(54) METHOD AND APPARATUS FOR DETERMINING THE FIBER ORIENTATION

(71) Applicant: VOITH PATENT GMBH, Heidenheim (DE)

(72) Inventors: Sime Ajit, Heidenheim (DE); Samuel Soldan, Giengen (DE); Michael Abele, Heidenheim (DE); Friedrich Kendel, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 736 days.

(21) Appl. No.: 17/913,947

(22) PCT Filed: Feb. 19, 2021

(86) PCT No.: PCT/EP2021/054104
§ 371 (c)(1),
(2) Date: Sep. 23, 2022

(87) PCT Pub. No.: WO2021/190832
PCT Pub. Date: Sep. 30, 2021

(65) Prior Publication Data
US 2023/0125911 A1 Apr. 27, 2023

(30) Foreign Application Priority Data
Mar. 23, 2020 (DE) ..................... 10 2020 107 855.2

(51) Int. Cl.
*G01N 21/88* (2006.01)
*G01N 21/64* (2006.01)
(Continued)

(52) U.S. Cl.
CPC ......... *G01N 21/6456* (2013.01); *G01N 21/86* (2013.01); *G01N 2021/8681* (2013.01);
(Continued)

(58) Field of Classification Search
None
See application file for complete search history.

(56) References Cited

U.S. PATENT DOCUMENTS

| | | | | |
|---|---|---|---|---|
| 4,730,931 A | * | 3/1988 | Watson | G01N 21/86 356/429 |
| 4,955,720 A | | 9/1990 | Blecha et al. | |

(Continued)

FOREIGN PATENT DOCUMENTS

| | | |
|---|---|---|
| AT | 507018 A1 | 1/2010 |
| WO | 2007024858 A1 | 3/2007 |

OTHER PUBLICATIONS

Filtjens, Benjamin: "Detection of Lint by Using Machine Vision". Hame University of Applied Sciences, 2017.

*Primary Examiner* — Neil N Turk
(74) *Attorney, Agent, or Firm* — Laurence A. Greenberg; Werner H. Stemer; Ralph E. Locher

(57) ABSTRACT
An apparatus and an associated method determine the fiber orientation of a moving fibrous web, in particular a paper, cardboard or cellulose web. An illumination device illuminates an area of the fibrous web and a camera records a digital image of the illuminated area of the fibrous web. The illumination device is configured to illuminate the fibrous web for a period of time of 1 μs or less and the camera is configured in such a way that the edge length of a pixel corresponds to no more than 20 μm, in particular no more than 10 μm.

14 Claims, 2 Drawing Sheets

(51) Int. Cl.
    *G01N 21/86*     (2006.01)
    *G06T 7/70*     (2017.01)
    *G06T 7/73*     (2017.01)

(52) U.S. Cl.
    CPC .................. *G01N 2201/062* (2013.01); *G01N 2201/1228* (2013.01)

(56)              References Cited

U.S. PATENT DOCUMENTS

| 5,640,244 | A | * | 6/1997 | Hellstrom | G01N 21/55 356/429 |
| 5,841,892 | A | * | 11/1998 | McGrath | G06T 7/73 382/173 |
| 7,695,592 | B2 | | 4/2010 | Shakespeare et al. | |
| 2002/0100569 | A1 | * | 8/2002 | Allen | G01N 33/346 162/198 |
| 2006/0024040 | A1 | * | 2/2006 | Gladnick | G01N 21/8806 348/E5.038 |
| 2006/0237156 | A1 | * | 10/2006 | Shakespeare | G01N 21/898 356/429 |
| 2006/0255300 | A1 | * | 11/2006 | Shakespeare | G01N 21/86 250/559.37 |
| 2012/0258547 | A1 | * | 10/2012 | Von Drasek | G01N 21/6486 436/172 |

* cited by examiner

Figure 2c       B-B ( 1 : 1 )

METHOD AND APPARATUS FOR DETERMINING THE FIBER ORIENTATION

FIELD AND BACKGROUND OF THE INVENTION

The invention relates to a method for determining the fiber orientation of a moving fibrous material web, in particular a paper, cardboard, or cellulose web, which includes the steps of illuminating an area of the fibrous material web for a time period, and recording a digital image of the illuminated area. The invention also relates to an associated apparatus for determining the fiber orientation of a moving fibrous material web, in particular a paper, cardboard, or cellulose web, including illumination means for illuminating an area of the fibrous material web, and a camera for recording a digital image of the illuminated area of the fibrous material web.

The fiber orientation is an important quality variable in the assessment of fibrous material webs, in particular in paper webs. In a paper web, the individual cellulose fibers are roughly aligned in the machine running direction due to the production process. However, this orientation can also deviate significantly from the machine running direction in dependence on various process settings or machine configurations.

The orientation of the fibers can influence many properties of the paper. The dimensional stability especially can worsen due to a deficient distribution of the fiber orientation. This is because of the fact, among other things, that fibers shrink relatively strongly in their diameter in comparison to their length upon heating. For example, if the fibers are oriented very strongly in the machine direction in a copier paper on the upper side, the sheet will shrink strongly in the width on this upper side upon copying. If the fibers on the lower side of the sheet are oriented less strongly or in another direction, the sheet thus shrinks less strongly on the lower side in the width direction. Tensions thus arise in the sheet, which then become visible in the form of the so-called "curls", thus a formation of waves or rolls of the sheet. Especially in the case of double-sided copying, this can also result in paper jams in the copier here.

In addition to the example described here, the fiber orientation is an important feature in nearly all types of paper, packaging, and cardboard. It is therefore desirable for the producer to already know the fiber orientation during the production process of the fibrous material web to be able to take countermeasures if necessary.

Several approaches are known for this purpose from the prior art. In particular, the publication U.S. Pat. No. 7,695,592 is to be cited here. An optical system is described here, in which the surface of the running paper web is illuminated and photographed using a camera. A value for the fiber orientation can then be calculated from the digital image by means of suitable mathematical methods. The method described there offers the advantage that it requires comparatively little expenditure. In the last 15 years since the application of the above patent specification, however, the production speed of paper machines has strongly increased. At high speeds, as U.S. Pat. No. 7,695,592 itself describes, blurred recordings ("blurring") of the web surface occur. This strongly influences the measurement result, and also cannot be completely corrected by mathematical preprocessing of the images.

SUMMARY OF THE INVENTION

It is therefore the object of the present invention to propose a method and a device to remedy the problems of the prior art.

In particular it is the object of the invention to enable a simple measurement of the fiber orientation even at high production speeds.

The object is achieved according to the invention by a method and an apparatus described below.

Further advantageous features of the embodiment according to the invention are found in the dependent claims.

With respect to the method, the object is achieved by a method for determining the fiber orientation of a moving fibrous material web, in particular a paper, cardboard, or cellulose web. The method comprises the following steps here illuminating a surface A of the fibrous material web for a time period $\Delta t$ recording a digital image of the illuminated surface A It is provided here according to the invention that the time period $\Delta t$ is at most 1 [µs], in particular at most 500 [ns], and the digital image has a sufficiently high resolution that the edge length of a pixel corresponds to less than 20 [µm], in particular less than 10 [µm].

In advantageous embodiments, the calculation of a fiber orientation from the data of the digital image can be provided.

The calculation of a fiber orientation from the data of a digital image is known per se. In this regard, reference is made, for example, to the overview article "Kellomäki, M., Kärkkäinen, S., Penttinen, A., & Lappalainen, T. (2003). *Determination of fiber orientation distribution from images of fiber networks.* Jyväskylä: University of Jyväskylä. *Publications of Laboratory of Data Analysis, Vol. 4*".

A suitable method is also described in U.S. Pat. No. 7,695,592. The fiber orientation during the paper production relates here to the preferred orientation of the individual fibers on the web. Due to the flow patterns in the headbox and the jet striking the screen, the fibers tend to align themselves in the machine direction (MD) in relation to other directions in the web. If all fibers were perfectly distributed in the web, the paper sheet would have the same properties in all directions. This is referred to as an isotropic sheet, and its fiber distribution can be plotted in the form of a circle in a polar diagram. A fiber ratio, which is the ratio of the maximum to the minimum fiber distribution in the interval of 90°, can be defined for a paper sheet. An isotropic sheet has a fiber ratio of one.

If more fibers are present in one direction than in other directions, the fibers are unevenly distributed and the film is anisotropic. Such anisotropic fiber distribution can be plotted in a polar diagram as an ellipse.

Relevant parameters of the fiber orientation can then be determined from the geometry of the ellipse. The angle $\Theta$, which the major axis of the ellipse describes with the machine direction, indicates the—mean—angle of the fiber orientation. The length ratio of the major axis to the minor axis describes the degree of anisotropy or the degree of the orientation. A high anisotropy indicates that a large proportion of the fibers is also actually aligned in the direction of the angle $\Theta$. An anisotropy close to 1 (i.e., an ellipse which is nearly circular) indicates that the fibers hardly have a preferred direction. The sheet is then nearly isotropic. The method described here is only to show by way of example how a calculation of the fiber orientation can be carried out from a digital image. Alternatively, however, other evaluation methods are also suitable, for example gradient-based methods. The invention is not restricted here to a specific calculation method.

In principle, a fiber orientation—thus, for example, an angle and an anisotropy—can be calculated using the known methods from any image of the paper surface. However, if the surface of the web is not imaged exactly enough by the image, the fiber orientation determined from this image thus does not have much to do with the real orientation of the fibers. If an excessively long exposure time is selected, for example, the web thus moves away during the exposure in the MD direction under the camera. A punctiform object on the web is imaged here as an MD-oriented stripe on the digital image. Due to this effect or defect in the image recording, the structure on the digital image is oriented much more strongly in MD than the actual fibrous material web. The fiber orientation calculated therefrom thus deviates significantly from the real fiber orientation. For a reliable determination of the fiber orientation, a sophisticated calculation method is therefore less necessary than rather the most accurate possible reproduction of the surface of the fibrous material web on the digital image.

Various aspects are to be considered to achieve such an accurate reproduction.

On the one hand, the resolution of the image has to be sufficiently high, and significantly higher than previously assumed in the prior art. If one previously presumed that the resolution has to be selected so that a pixel approximately has to correspond to the diameter of a fiber of approximately 40 μm, the inventors have recognized that for a reliable determination of the fiber orientation, the edge length of a pixel is less than 20 μm, advantageously even less than 10 μm. In particularly preferred embodiments, the edge length of a pixel can also be less than 8 μm.

Moreover, this high resolution has to be combined with an image which is not blurry.

The following exemplary calculation is to illustrate the order of magnitude here.

At a machine speed of 1000 m/min, which is presently rather below average, the web moves approximately 16 m/s, or 16 μm/μs. The web thus moves by about half a fiber diameter in one μs. At the resolution of the image according to the invention, this also approximately corresponds to the dimension of a pixel.

Therefore, extremely short exposure times are required during the recording. The inventors have found out here that it is not possible, or it is not possible with implementable expenditure, to implement these short exposure times solely via correspondingly short shutter speeds of a camera. The proposed method therefore provides that the surface A, of which a digital image is recorded, is illuminated for a time period $\Delta t$ of at most 1 [μs], in particular 500 [ns] or less. Significantly shorter illumination times of 200 [ns] or less are even implementable with acceptable expenditure using the present technology.

Using such a method, reliable measurements of the fiber orientation are possible even for machine speeds or web speeds of greater than 1200 m/min or even greater than 1400 m/min.

It has proven to be advantageous that light having wavelengths in the range between 450 [nm] and 780 [nm], in particular between 450 [nm] and 550 [nm] or between 600 [nm] and 700 [nm], is used for the illumination. This has the advantage, on the one hand, that typical CMOS chips of digital cameras are very sensitive for light in this spectral range, and thus a sufficient amount of light can be acquired.

Moreover, a so-called "optical brightener" is admixed to some types of paper. These are usually fluorescent substances, the function of which is increasing the degree of whiteness, in particular by compensation of the yellow tinge, of materials. The fluorescent materials used most for this purpose emit in a range less than 480 [nm], especially less than 450 [nm]. To avoid interference with the measurement result by these fluorescence effects, the illumination using light of 450 [nm], in particular greater than 500 [nm] wavelength is advantageous.

Furthermore, a narrowband illumination can preferably be used, in which the wavelengths used for the illumination have a bandwidth of at most 100 [nm], in particular at most 50 [nm].

Furthermore, it is advantageous if the light of the illumination is incident at an angle $\alpha$ on the fibrous material web, which deviates at most 45°, in particular between 25° and 40° from the perpendicular.

In the case of a flatter light incidence at an angle $\alpha$ of greater than 45° to the perpendicular, shadows are increasingly thrown on the paper surface—for example by fibers or fiber parts protruding out of the sheet. These shadows can have an interfering effect on the calculation of the fiber orientation from the digital image, or the calculated value can thus noticeably deviate from the actual fiber orientation.

Furthermore, such a steep light incidence is also advantageous if fittings are also located between the light sources and the fibrous material web, for example, a glass plate to protect the optical devices.

A fully perpendicular incidence of the light on the fibrous material web would certainly be theoretically optimal. However, on the one hand this is difficult to implement structurally. On the other hand, reflected light would be reflected directly into the camera in such an arrangement, which could interfere with the measurement.

The preferred range between 45° and 25° represents an optimum compromise in a certain sense.

To obtain reliable measured values, it is advantageous if the illuminated area A comprises a square of 5 mm×5 mm, in particular of 10 mm×10 mm.

In preferred applications, an image size of the digital image of 11 mm×9 mm was used; the illuminated area A was at least as large here.

A larger area is advantageous in principle since thus a sufficient number of fibers can be imaged. This supplies more accurate values in particular in the calculation of the fiber orientation.

The object is achieved with respect to the apparatus by an apparatus for determining the fiber orientation of a moving fibrous material web, in particular a paper, cardboard, or cellulose web, comprising illumination means for illuminating an area A of the fibrous material web, and a camera for recording a digital image of the illuminated area A of the fibrous material web. It is provided according to the invention that the illumination means are configured to illuminate the fibrous material web for a time period of 1 [μs] or less, and also that the camera is configured in such a way that the edge length of a pixel corresponds to at most 20 [μm], in particular at most 10 [μm], wherein the apparatus moreover comprises a processing unit which is configured to calculate a fiber orientation from the data of a digital image of the camera.

Reference is made to the corresponding statements of the description of the method with respect to the calculation of the fiber orientation from the digital image.

The term "the illumination means" describes the one apparatus, which comprises one or more light sources, together with mounting devices and the associated lines and electrical or electronic components.

Some or all elements of such illumination means are often arranged on printed circuit boards (PCB).

The camera and the illumination means are typically installed together in a common sensor unit, which can be installed in the machine in direct proximity to the fibrous material web. This sensor unit can be embodied as traversing, thus movable along the machine transverse direction. The processing unit can either also be installed in the sensor unit or can be provided outside the machine. In the first case, the calculation of the fiber orientation takes place in the machine itself. This has the advantage that only these fiber orientation values and thus very small amounts of data have to be transferred from the machine. These small amounts of data can be transferred from the machine using nearly any transfer technology—wired or wireless.

In the second case, all of the image data have to be transferred, preferably in real time, from the sensor unit to the processing unit. This places significantly greater demands on the data transfer.

In one preferred embodiment, it can be provided that the illumination means comprise multiple light sources, in particular multiple LEDs, which are arranged uniformly and annularly around the camera.

It is very particularly advantageous here if the light sources used are structurally identical light sources, especially structurally identical LEDs.

The advantage of the annular arrangement is that the most homogeneous possible, uniform illumination of the area A can thus be achieved. Artifacts can thus be avoided in the calculation of the fiber orientation, which could arise, for example, due to one-sided illumination.

The uniform distribution of the light sources along the circumference of the ring is also used for the same purpose of homogenizing the illumination. If 9 light sources are used in the illumination means, for example, these are advantageously to be arranged at an angle interval of $360°/9=40°$ along the circular ring.

As already described, the light sources are advantageously to be arranged so that their light is incident at an angle α on the fibrous material web, which deviates at most 45°, in particular between 25° and 40° from the perpendicular.

Since the most homogeneous possible illumination of the area A is desirable, as described, in particular all light sources are to be aligned at the same angle on the fibrous material web.

The inventors have surprisingly found out that it is advantageous if the illumination means have an odd number of light sources. With regard to the described advantages of the homogeneous illumination, one could suspect that an even number of light sources would be advantageous. However, it has been shown that disadvantageous quantization effects occur in this case. The avoidance of directed quantization by an odd number of light sources has proven to be advantageous.

The number of the light sources is dependent on, among other things, the structural size of the light sources and the available installation space. For example, 11, 13, 15, or 17 light sources can be used.

In preferred embodiments, it can be provided that a plate, which is entirely or substantially transparent to the light, is arranged between the illumination means and the fibrous material web and/or between the camera and the fibrous material web.

Fiber fragments or fine particles or filler particles can detach from a moving fibrous material web—in particular at high speeds—and accumulate on the machine parts and fittings. A plate as described above, which can be embodied from glass or plastic, for example, can be used for the purpose of avoiding soiling of the camera and the illumination means.

Cleaning devices can possibly also be provided, for example, nozzles for flushing with air or water to remove soiling from the plate.

During the operation of the measuring device, comparatively large currents often flow to implement the required luminous intensity and the short illumination times. It is therefore advantageous if the illumination means are at least temporarily suitable for being operated at an amperage of at least 10 [A]. This can have an influence on the dimensioning of the conductor tracks. It can moreover be helpful to provide means for dissipating the heat arising on or in the illumination means.

It can advantageously be provided that the optical properties and the aperture settings using apertures between F4 and F16 of the lens of the camera enable a resolution which corresponds to an edge length of a pixel of at most 20 [μm], in particular at most 10 [μm] of the illuminated area A.

Enough depth of field to resolve a sharp image can still be obtained via a somewhat closed aperture in spite of the light losses. This is advantageous since cellulose fibers are typically between 10 μm and 50 μm thick, and can sometimes protrude out of the surface of, for example, a paper web. Such a web therefore has a very rough topography in the micrometer range. The camera is advantageously capable of still presenting this topography sharply.

Furthermore, the apparatus which comprises a guide rail suitable for stabilizing the fibrous material web in a position is advantageous.

The fibrous material web is stabilized here at a distance to the camera to enable a uniform focus range. The guide rail can stabilize the position of the fibrous material web by suitable airflow. Air nozzles or a possibility of removing air by a negative pressure can also assist the stabilizing effect. Air nozzles can also be integrated directly in the guide rail.

In the following, the invention is explained in more detail on the basis of schematic figures, which are not to scale.

DETAILED DESCRIPTION OF THE INVENTION

Figure 1:
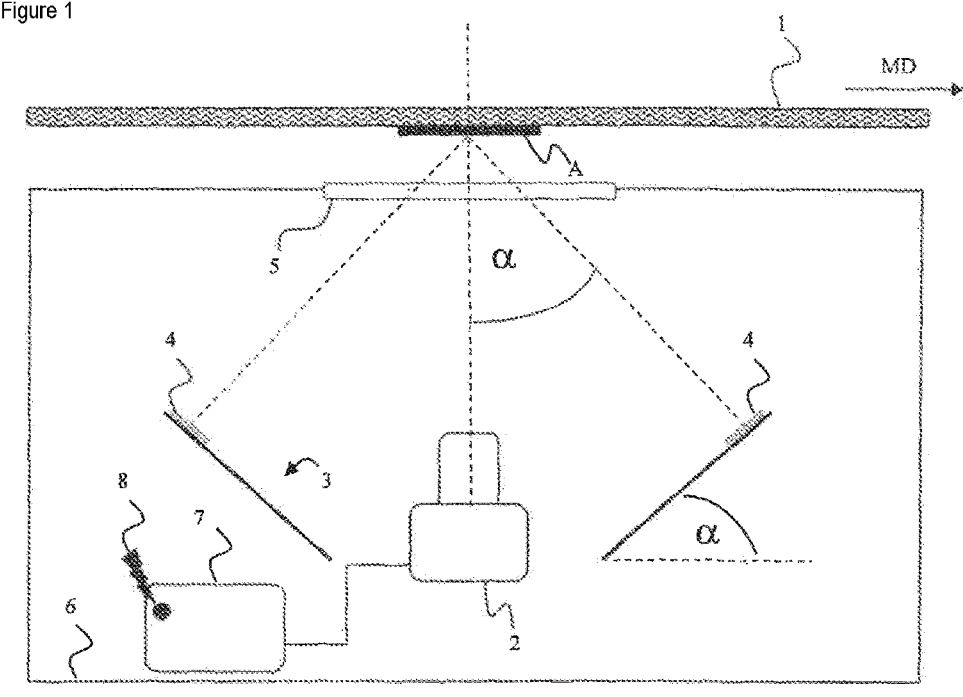
FIG. 1 schematically shows a section through an apparatus for determining the fiber orientation according to one aspect of the invention

FIG. 1 shows a fibrous material web 1, for example, a paper web 1 or a packaging web 1, which is moved in the machine direction MD. The speed of the fibrous material web 1 can be greater than 1000 m/min, in particular more than 1200 m/min here. A camera 2 is provided to record a digital image of an area A of a surface of the fibrous material web 1. In the embodiment shown in FIG. 1, an image of the lower side is recorded here. Alternatively or additionally, a camera 2 can also be arranged above the fibrous material web 1 to record an image of the upper side. Furthermore, illumination means 3 are provided to illuminate the surface of the fibrous material web 1. The illuminated area comprises the area A, which is acquired by means of the camera 2. The area A advantageously comprises a square of 5 mm×5 mm, in particular of 10 mm×10 mm. The recorded area does not have to be a square here. In tests, for example, pictures of 11 mm×9 mm were successfully prepared.

The illumination means 3 comprise a plurality of light sources 4. These light sources 4 are embodied in FIG. 1 as LEDs 4, which are arranged uniformly and annularly around the camera 2. As described, an odd number of light sources 4 is advantageous.

The illumination means 3 are embodied here so that the light of the light sources 4 is incident at an angle α—measured from the perpendicular— on the surface of the paper web 1. This angle α is advantageously <45°, that is to say the light is incident comparatively steeply on the surface. This prevents shadows on the surface topography from corrupting the measurement result, for example.

The illumination means 3 are moreover configured to illuminate the area A, of which a digital image is recorded, for a time period Δt of at most 1 [μs], in particular of 500 [ns] or less. Significantly shorter illumination times of 200 [ns] or less are even implementable with acceptable expenditure using the current technology.

In the embodiment of FIG. 1, the apparatus has a housing 6, for example, of a box made of metal. This housing 6 forms the outer wall of the sensor unit. A plate 5 is provided in the housing 6, which can consist of glass or plastic, for example, and which is entirely or largely transparent to the light of the light sources 4. The fibrous material web 1 is illuminated and also the digital image is recorded through this plate 5. To remove soiling which can accumulate on the plate 5, cleaning devices can moreover also be provided, for example, nozzles for flushing the plate 5 using air or water. These cleaning devices are not explicitly shown in FIG. 1.

In the embodiment of FIG. 1, the processing unit 7 is arranged within the sensor unit, thus in the interior of the housing 6. Furthermore, a transfer device 8 is provided to transfer data from the processing unit 7 to a receiving station which is arranged outside the actual paper machine. Since in this embodiment the calculation of the fiber orientation is carried out by the processing unit 7 in the interior of the sensor unit, the transfer device 8 only has to transfer very small amounts of data.

Figure 2A:
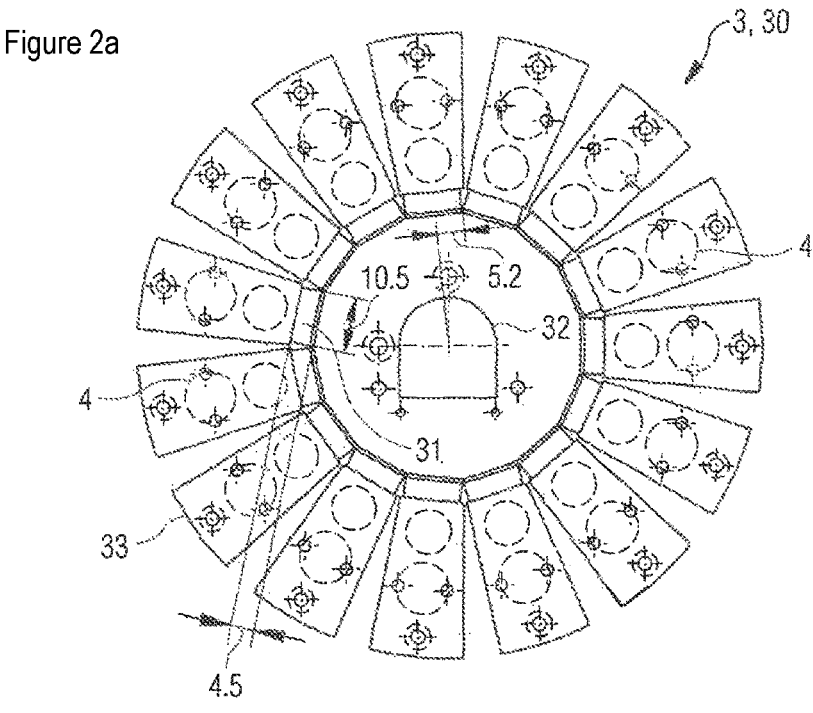
FIG. 2 shows, in partial FIGS. 2a, 2b, 2c, a possible embodiment for illumination means for use in an apparatus according to one aspect of the invention.
Figure 2B:
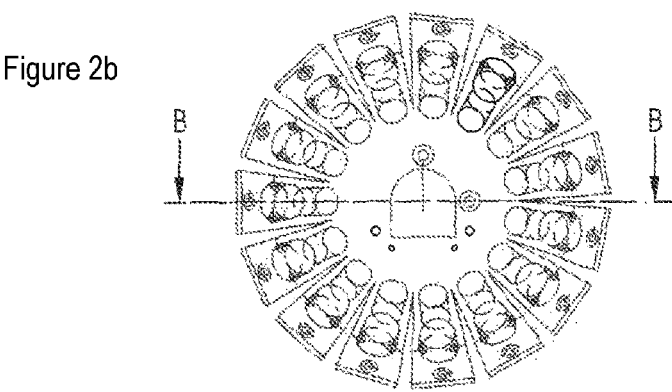
Figure 2B:
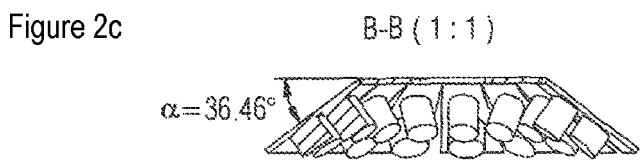

FIG. 2, or partial FIGS. 2a, 2b, and 2c, show details of illumination means 3, which can in particular also be used in the embodiment shown in FIG. 1. Illumination means 3 of this type moreover also represent an inventive concept alone and can be used in other fields independently of the use for determining the fiber orientation.

A printed circuit board 30 represents a central element of these illumination means 3. In the top view of FIG. 2a, it can be seen that this printed circuit board 30 is embodied in the form of a flower. A recess 32 for the camera 2 is provided in the center of the printed circuit board 30. Around the center, 15 "flower petals" 33 are arranged symmetrically. These flower petals 33 are parts of the printed circuit board 30 which are each connected via a flexible connection 31 to the center. These flower petals 33 are advantageously all embodied identically. They each comprise a light source 4. For example, "Oslon SSL 80" LEDs from Osram are suitable as the light source.

Via the flexible connection, the flower petals 33 can be set so that the light of the light sources 14 is incident at the desired angle α on the fibrous material web 1. FIG. 2b shows in perspective the printed circuit board 30 of FIG. 2a, in which the flower petals 33 were already inclined at the flexible connection 31. As described, the angle is to be less than 45°. FIG. 2c shows a section through FIG. 2b along line B. In the embodiment shown in FIG. 2, the flower petals were set at an angle α between 36° and 37°.

LIST OF REFERENCE SIGNS

1 fibrous material web
2 camera

8

3 illumination means
4 light source
5 plate
6 housing
7 processing unit
8 transfer device
30 printed circuit board
31 flexible connection
32 recess
33 "flower petal"
A image area
MD machine direction

The invention claimed is:

1. A method for determining the fiber orientation of a moving fibrous material web, paper web, cardboard web or cellulose web, the method comprising:
   illuminating an area A of the moving fibrous material web, paper web, cardboard web or cellulose web for a time period Δt;
   recording a digital image of the illuminated area A;
   setting the time period Δt to be at most 1 μs; and
   the digital image having a sufficiently high resolution to cause an edge length of a pixel of the digital image to correspond to less than 20 μm of the imaged area A;
   calculating the fiber orientation from data of the digital image.

2. The method according to claim 1, which further comprises:
   setting the time period Δt to be at most 500 ns; and
   providing the digital image with a sufficiently high resolution to cause the edge length of the pixel to correspond to less than 10 μm of the imaged area A.

3. The method according to claim 1, which further comprises calculating a fiber orientation from data of the digital image.

4. The method according to claim 1, which further comprises carrying out an illumination of the area A by light having wavelengths in a range of 450 nm-780 nm.

5. The method according to claim 4, which further comprises carrying out the illumination of the area A by light having wavelengths in a range of between 450 nm and 550 nm.

6. The method according to claim 4, which further comprises carrying out the illumination of the area A by light having wavelengths in a range of 600 nm-700 nm.

7. The method according to claim 1, which further comprises using wavelengths for an illumination of the area A having a bandwidth of at most 100 nm.

8. The method according to claim 1, which further comprises using wavelengths for an illumination of the area A having a bandwidth of at most 50 nm.

9. The method according to claim 1, which further comprises directing light illuminating the area A to be incident on the fibrous material web, paper web, cardboard web or cellulose web at an angle a deviating at most 45° from a perpendicular.

10. The method according to claim 1, which further comprises directing light illuminating the area A to be incident on the fibrous material web, paper web, cardboard web or cellulose web at an angle a deviating between 25° and 40° from a perpendicular.

11. The method according to claim 1, which further comprises providing the illuminated area A as a square of at least 5 mm×5 mm.

12. The method according to claim 1, which further comprises providing the illuminated area A as a square of 10 mm×10 mm.

13. The method according to claim 1, which further comprises moving the fibrous material web, paper web, cardboard web or cellulose web at a speed of greater than 1000 m/min.

14. The method according to claim 1, which further comprises moving the fibrous material web, paper web, cardboard web or cellulose web at a speed of greater than 1200 m/min.

* * * * *